United States Patent [19]

Eto et al.

[11] Patent Number: 5,132,908
[45] Date of Patent: Jul. 21, 1992

[54] DRIVING FORCE DISTRIBUTION CONTROL SYSTEM FOR A FOURWHEEL DRIVE VEHICLE

[75] Inventors: Yoshiyuki Eto, Isehara; Toshiro Matsuda, Sagamihara, both of Japan

[73] Assignee: Nissan Motor Co., Ltd., Yokohama, Japan

[21] Appl. No.: 507,888

[22] Filed: Apr. 12, 1990

[30] Foreign Application Priority Data

| Apr. 28, 1989 | [JP] | Japan | 1-111417 |
| Apr. 28, 1989 | [JP] | Japan | 1-111418 |
| Apr. 28, 1989 | [JP] | Japan | 1-111419 |

[51] Int. Cl.$^5$ ............................ B60K 17/348
[52] U.S. Cl. ............... 364/426.03; 180/197; 180/248
[58] Field of Search ............ 180/197, 248, 249; 364/426.03, 424.1

[56] References Cited

U.S. PATENT DOCUMENTS

| 4,700,797 | 10/1987 | Leiber | 180/197 X |
| 4,754,834 | 7/1988 | Ozaki et al. | 180/233 |
| 4,757,870 | 7/1988 | Torii et al. | 180/233 |
| 4,773,500 | 9/1988 | Naito et al. | 180/233 |
| 4,776,424 | 10/1988 | Naito | 180/233 |
| 4,846,298 | 7/1989 | Naito | 180/233 |
| 4,860,208 | 8/1989 | Bantle | 180/248 X |
| 4,874,056 | 10/1989 | Naito | 180/233 |
| 4,884,650 | 12/1989 | Fujiki et al. | 180/248 X |
| 4,887,689 | 12/1989 | Naito | 364/424.1 X |
| 4,890,685 | 1/1990 | Naito | 364/424.1 |
| 4,936,406 | 6/1990 | Tezuka et al. | 180/249 |
| 4,937,750 | 6/1990 | Gilliam | 180/248 X |
| 4,966,249 | 10/1990 | Imaseki | 180/248 X |
| 4,984,649 | 1/1991 | Leiber et al. | 180/249 X |
| 4,989,686 | 2/1991 | Miller et al. | 180/248 X |
| 5,010,974 | 4/1991 | Matsuda | 180/233 |

FOREIGN PATENT DOCUMENTS

| 61-132421 | 6/1986 | Japan . |
| 62-12422 | 1/1987 | Japan . |
| 62-191224 | 8/1987 | Japan . |
| 62-279129 | 8/1987 | Japan . |
| 62-265028 | 11/1987 | Japan . |
| 62-265030 | 11/1987 | Japan . |
| 62-279132 | 12/1987 | Japan . |
| 63-78822 | 4/1988 | Japan . |
| 63-203421 | 8/1988 | Japan . |
| 62-220458 | 3/1989 | Japan . |
| 63-325379 | 8/1989 | Japan . |

*Primary Examiner*—Parshotam S. Lall
*Assistant Examiner*—Thomas S. Auchterlonie
*Attorney, Agent, or Firm*—Foley & Lardner

[57] ABSTRACT

A driving force distribution control system for a vehicle includes a torque distributing clutch for varying a driving force transmitted to a secondary drive wheels in response to a control signal, sensors for determining a wheel speed difference between the wheel speed of primary drive wheels and the wheel speed of the secondary drive wheels, and a longitudinal acceleration, and a control unit for controlling the clutch engagement force of the torque distributing clutch by producing the control signal. The control unit has a first control mode for normally controlling the clutch engagement force in accordance with the wheel speed difference, and a second control mode for controlling the clutch engagement force in accordance with the longitudinal acceleration so as to prevent undesired hunting when a wheel spin of the primary or secondary drive wheels is detected.

27 Claims, 10 Drawing Sheets

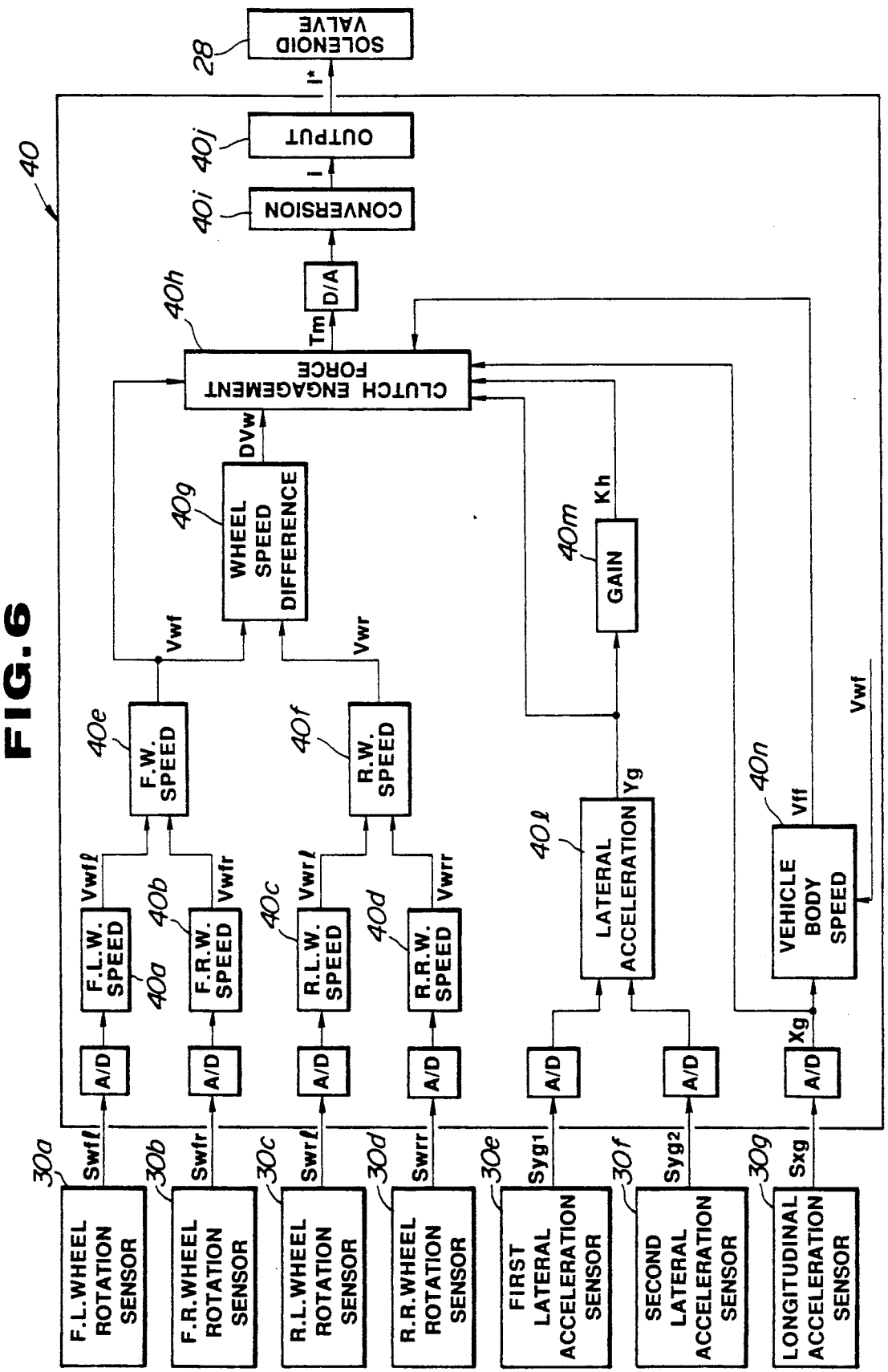

DRIVING FORCE DISTRIBUTION CONTROL SYSTEM FOR A FOURWHEEL DRIVE VEHICLE

BACKGROUND OF THE INVENTION

The present invention relates to a control system for controlling a driving force distribution between front wheels and rear wheels of a vehicle, and more specifically to a driving force distribution control system capable of preventing hunting during acceleration on a low friction coefficient road surface.

Driving force distribution control systems responsive to a front and rear wheel speed difference are known. A conventional system is designed to combine the handling advantage of the rear wheel drive, and the advantage of the four wheel drive in driving ability by increasing the driving force transmitted to the front wheels continuously with increase in the wheel speed difference. This control system thus controls the driving force distribution so as to reduce the wheel speed difference to zero by feeding back the wheel speed difference.

However, this conventional control system is susceptible to undesirable hunting because of the existence of the feedback loop especially in a starting operation or a medium acceleration on a low friction coefficient road surface. When the front or rear wheels undergo a wheel spin (overspeed rotation) in such a situation, it readily affects the wheel speed difference by affecting the output of the wheel speed sensor, and results in undesirable oscillation of the clutch engagement force of a torque distributing transfer clutch. This oscillation, that is, hunting, causes unpleasant noises and vibrations.

FIG. 13 shows oscillation of the clutch engagement force which is produced by the conventional system when a vehicle having rear wheels directly driven by the engine and front wheels driven through a torque distributing transfer clutch is rapidly started on a slippery road surface. Immediately after the start, as shown in FIG. 13, the rear wheels fall into wheel spin, and causes an increase in the wheel speed difference. In response to this increase in the wheel speed difference, the control system increases the clutch engagement force and increases the engine torque transmitted to the front wheels. By receiving the engine torque, the front wheels increase their speed rapidly because the inertia of the front wheel drive system is smaller than that of the rear drive system, and the front wheels too fall into wheel spin. This front wheel spin causes a sharp decrease in the wheel speed difference, and the control system sharply decreases the clutch engagement force. With the sharp decrease of the clutch engagement force, the front wheels of the smaller inertia regain their gripping ability, and the wheel speed difference is sharply increased again. In this way, the conventional control system causes the clutch engagement force to swing upwardly and downwardly as shown in FIG. 13. During this hunting state, the front wheels of smaller inertia alternate between the state of wheel spin and the state of grip in response to the oscillation of the clutch engagement force, while the rear wheels of greater inertia continue in the wheel spin state.

SUMMARY OF THE INVENTION

It is an object of the present invention to provide a driving force distribution control system which can prevent undesirable hunting.

According to the present invention, a driving force distribution control system for a vehicle comprises a torque distributing means, a first detecting means, a condition discriminating means, and a controlling means.

The torque distributing means comprises a primary drive means for transmitting a driving force from an engine of the vehicle to primary drive wheels, and a secondary drive means for transmitting a driving force from the engine to secondary drive wheels of the vehicle through a torque distributing clutch which is capable of varying the driving force transmitted to the secondary drive wheels in response to a control signal.

The first detecting means determines a wheel speed difference between a primary wheel speed of the primary drive wheels and a secondary wheel speed of the secondary drive wheels.

The condition discrimating means detects a wheel spin of at least one of the wheels, and produces a wheel spin condition signal which is normally in a first signal state, and in a second signal state when the wheel spin is detected.

The controlling means controls a clutch engagement force of the torque distributing clutch by producing the control signal in accordance with the wheel speed difference when the wheel spin condition signal is in the first signal state, and controls the clutch engagement force independently of the wheel speed difference so as to prevent the clutch engagement force from being decreased by a decrease of the wheel speed difference when the wheel spin condition signal is in the second signal state.

In illustrated embodiments of the invention, the control system comprises, as shown in FIG. 1, the primary drive means 302 for transmitting the driving force from the engine 301 to the primary drive wheels 303 such as the rear wheels, the secondary drive means 304 for transmitting the driving force to the secondary drive wheels 305 such as the front wheels through the torque distributing clutch 306, the first detecting means 307 for determining the wheel speed difference DVw, the condition discriminating means 308 for producing the wheel spin condition signal, and the controlling means 309.

The condition discriminating means 308 may be connected with a means 311 for sensing the primary or secondary wheel speed and a means 310 for estimating a vehicle body speed, and arranged to detect the wheel spin by comparing the primary or secondary wheel speed with the vehicle body speed.

The controlling means 309 may comprises a first processing means 309a for determining a first desired clutch engagement force in accordance with the wheel speed difference, a second processing means 309b for determining a second desired clutch engagement force which increases as a longitudinal acceleration sensed by a means 312 increases, and a third processing means for producing the control signal by selecting one between the first and second desired clutch engagement forces. Each of the first and second processing means 309a and 309b may be arranged to modify the control characteristic in accordance with a lateral acceleration sensed by a mean 313.

BRIEF DESCRIPTION OF THE DRAWINGS

FIG. 6 is a block diagram showing a control unit according to a second embodiment of the invention.

DETAILED DESCRIPTION OF THE INVENTION

Figure 1:
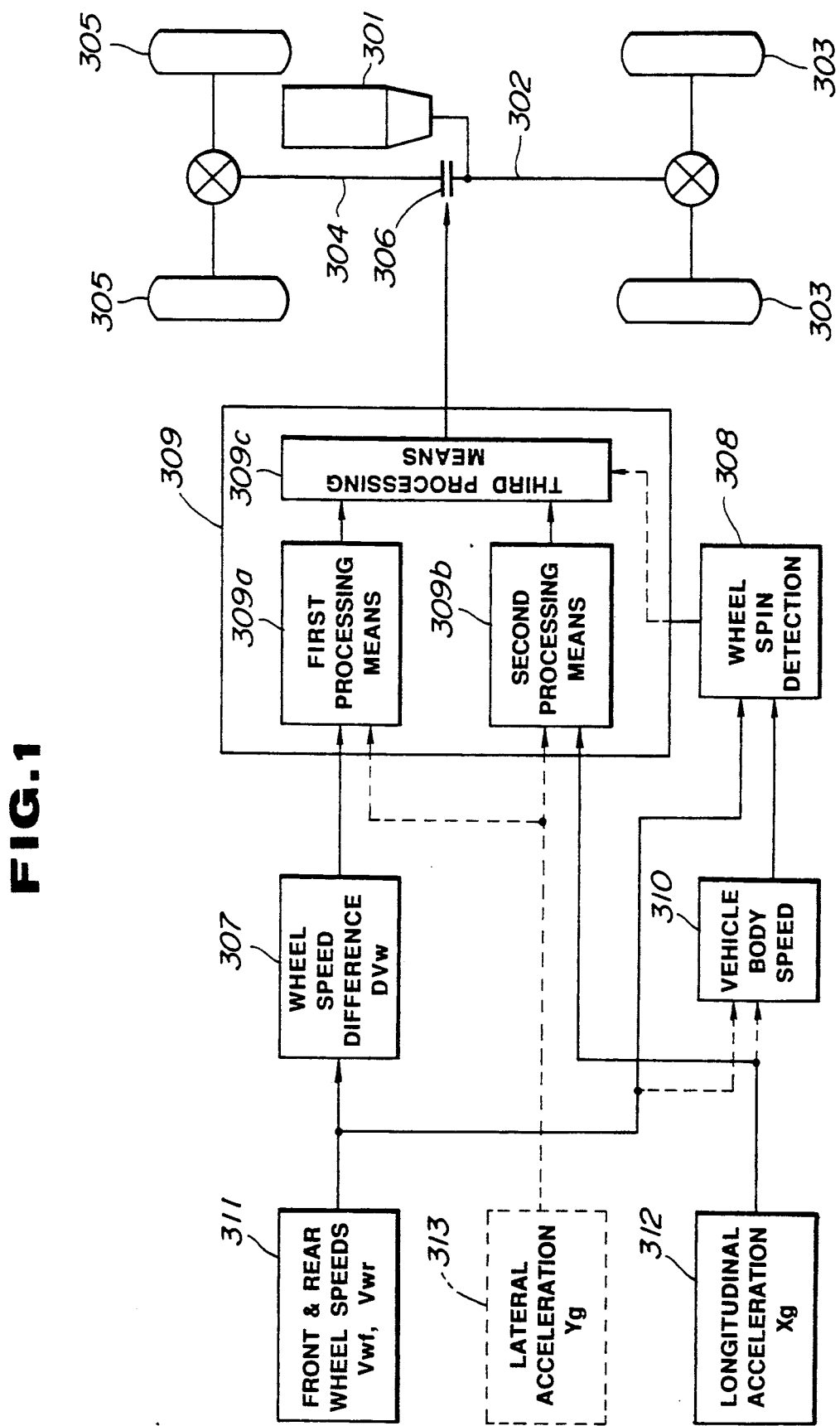
FIG. 1 is a schematic view showing various means used in the invention.
Figure 2:
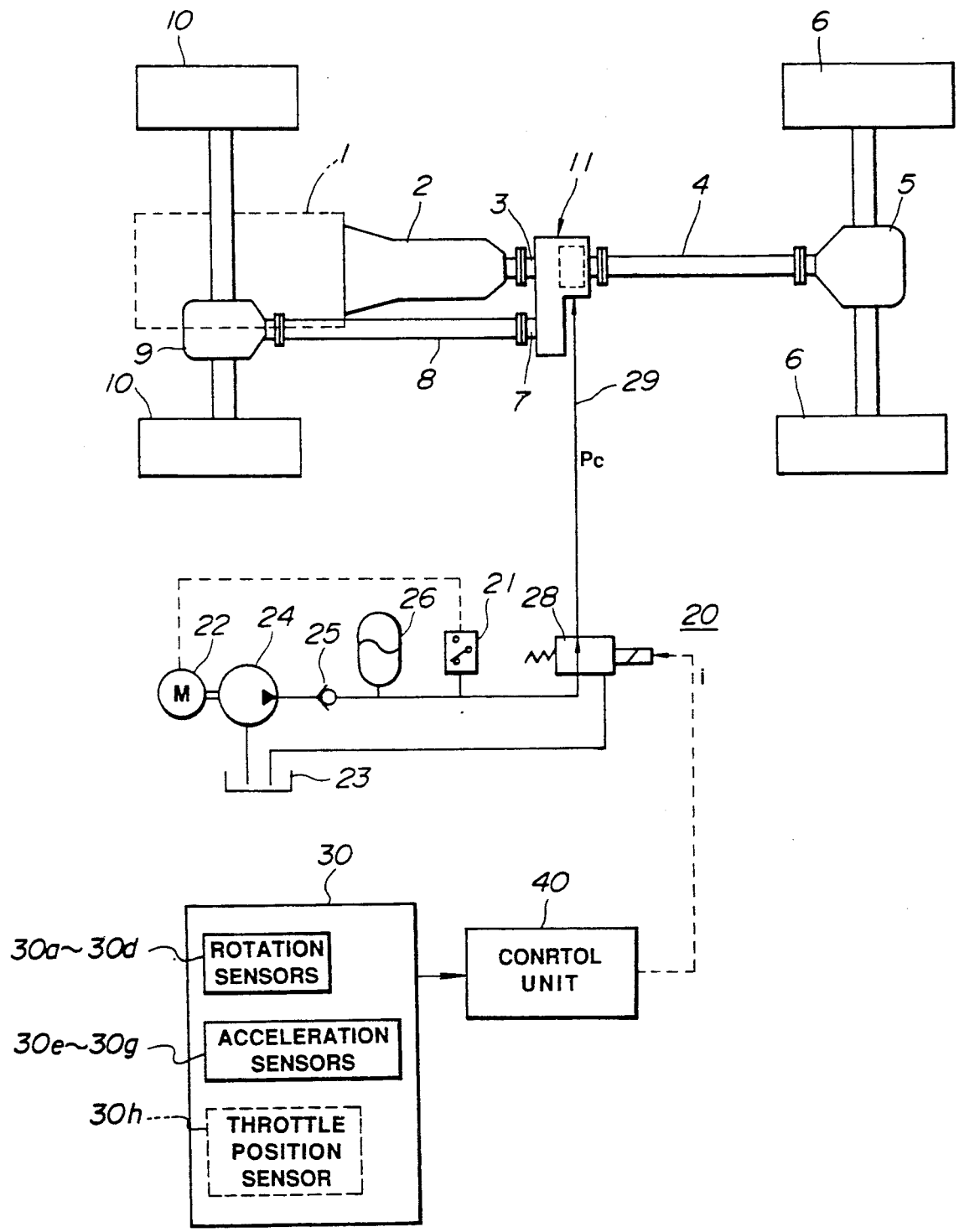
FIG. 2 is a schematic view of a four wheel drive vehicle equipped with a driving force control system according to a first embodiment of the invention.
Figure 3:
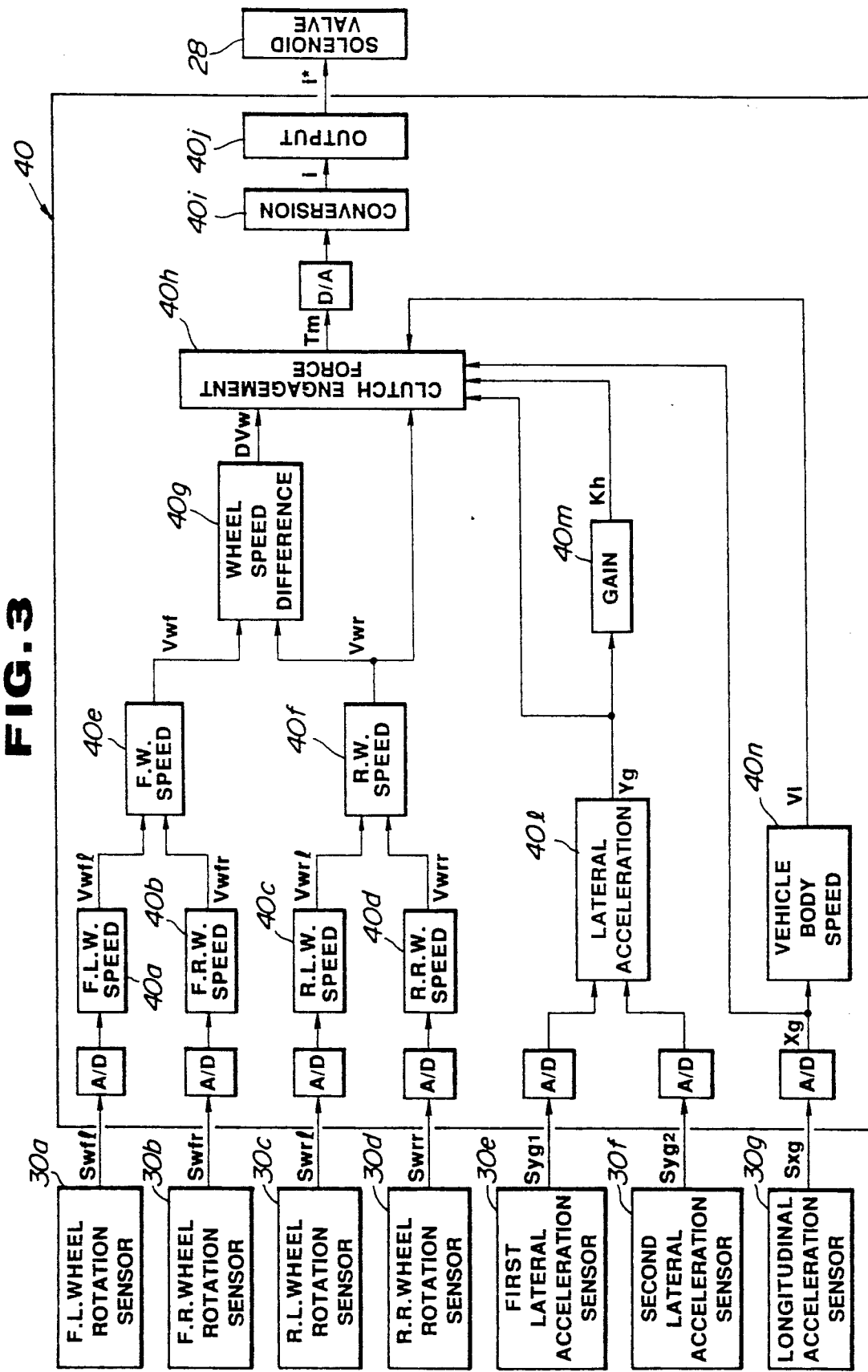
FIG. 3 is a block diagram showing a control unit of the first embodiment.
Figure 4:
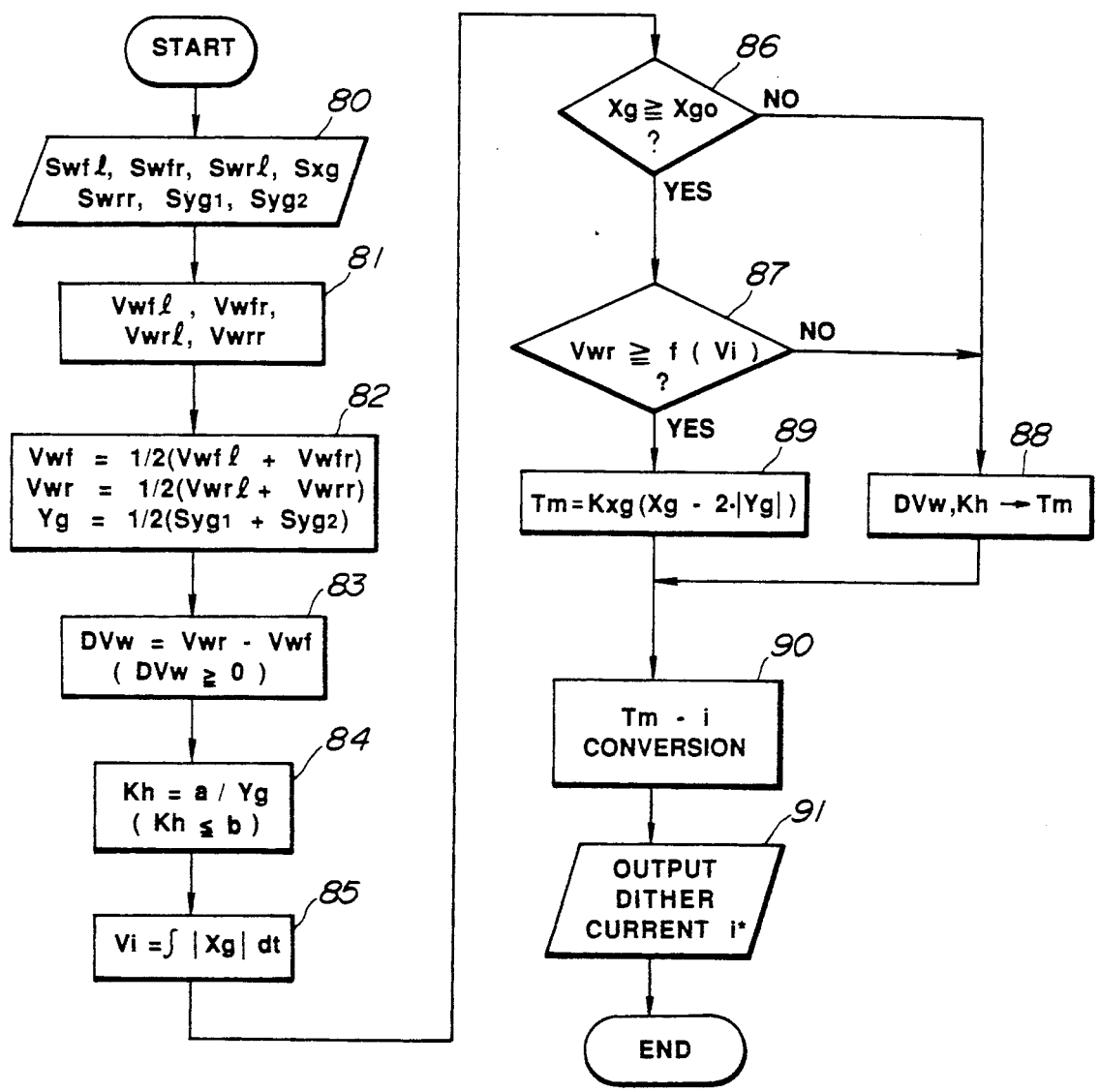
FIG. 4 is a flow chart showing a control procedure performed by the control unit of the first embodiment.

A first embodiment of the present invention is shown in FIGS. 2-4.

FIG. 2 shows a 4WD vehicle equipped with a torque split control system (driving force distribution control system).

The vehicle has a drive system which includes a prime mover such as an engine 1, a transmission 2, a transfer input shaft 3, a rear propeller shaft 4, a rear differential 5, rear wheels 6, a transfer output shaft 7, a front propeller shaft 8, a front differential 9, front wheels 10, and a transfer 11. In this embodiment, the rear wheels 6 are primary drive wheels, and the front wheels 10 are secondary drive wheels. From the transmission 2, engine torque is transmitted to the rear wheels 6 through a rear drive line which serves as a primary drive means for transmitting engine torque directly to the primary drive wheels, and transmitted to the front wheels 10 through a front drive line which serves as a secondary drive means having a torque distributing clutch (or a transfer clutch). In this embodiment, the torque distributing clutch is a wet type multiple disc clutch provided in the transfer 11. Therefore, the engine torque is transmitted directly to the rear wheels 6. On the other hand, the engine torque is transmitted to the front wheels 10 through the torque distributing clutch which is capable of continuously varying the torque transmitted to the front wheels, and completely disconnecting the front wheels 10 from the engine 1. The transfer and its torque distributing clutch are illustrated and explained more in detail in commonly assigned U.S. Pat. Nos. 4,754,834; 4,757,870; 4,773,500; 4,776,424; 4,846,298; 4,874,056 and 4,887,689, commonly assigned U.S. Applications Ser. Nos. 07/254,875; now U.S. Pat. No. 4,941,541 07/255,820 now U.S. Pat. No. 4,966,250; 07/277,377 now U.S. Pat. No. 4,890,685 and 07/255,939, now U.S. Pat. No. 4,966,249 and Japanese Patent Application No. 63-325379. The related explanations and figures of these patents are herein incorporated by reference.

The torque split (driving force distribution) control system further includes a hydraulic system 20 for producing a control oil pressure Pc supplied to the distributing clutch, a group of various sensors 30, and a torque split control unit 40. The control unit 40 produces a dither current i* in accordance with output signals of the sensors 30, and controls the clutch engagement force of the torque distribution clutch of the transfer 11 by sending the dither current to a solenoid valve 28 of the hydraulic system 20.

The hydraulic system 20 includes a relief switch 21, a motor 22, an oil reservoir tank 23, an oil pressure pump 24, a check valve 25, an accumulator 26, and the above mentioned solenoid valve 28. The motor 22 is turned on and off by the relief switch 21, and drives the oil pump 24 which sucks the oil from the reservoir tank 23. The oil pressure discharged from the pump 24 (primary oil pressure) is supplied through the check valve 25, and stored in the accumulator 26. The solenoid valve 28 receives a line pressure (secondary pressure) from the accumulator 26, and produces the control oil pressure Pc in accordance with the dither current i* sent from the control unit 40. The control oil pressure Pc is supplied to the torque distributing clutch of the transfer 11 through an oil pipe 29. In this way, the control unit 40 can vary the engagement force of the torque distributing clutch substantially in a continuous (stepless) manner.

As shown in FIG. 3, the sensor group 30 of this embodiment includes a front left wheel rotation sensor 30a for sensing the number of revolutions of the front left wheel 10, a front right wheel rotation sensor 30b for sensing the number of revolutions of the front right wheel 10, a rear left wheel rotation sensor 30c for sensing the number of revolutions of the rear left wheel 6, a rear right wheel rotation sensor 30d for sensing the number of revolutions of the rear right wheel 6, a first lateral (side) acceleration sensor 30e, a second lateral (side) acceleration sensor 30f, and a longitudinal acceleration sensor 30g for sensing a longitudinal acceleration of the vehicle, and producing a signal Sxg representing the longitudinal acceleration.

The torque split control unit 40 includes a circuit 40a for receiving the signal Swfl of the front left wheel rotation sensor 30a and determining a front left wheel speed Vwfl, a circuit 40b for receiving the signal Swfr of the front right wheel rotation sensor 30b and determining a front right wheel speed Vwfr, a circuit 40c for receiving the signal Swrl of the rear left wheel rotation sensor 30c and determining a rear left wheel speed Vwrl, and a circuit 40d for receiving the signal Swrr of the rear right wheel rotation sensor 30d and determining a rear right wheel speed Vwrr. The torque split control unit 40 further includes a circuit 40e connected with the circuits 40a and 40b, for determining a front wheel speed Vwf, a circuit 40f connected with the circuits 40c and 40d, for determining a rear wheel speed Vwr, and a circuit 40g connected with the circuits 40e and 40f, for determining a front and rear wheel speed difference DVw. The front wheel speed Vwf is an average (arithmetic mean) of Vwfl and Vwfr, and the rear wheel speed Vwr is an average (arithmetic mean) of Vwrl and Vwrr. In this embodiment, the front and rear wheel speed difference DVw is a difference obtained by subtracting the front wheel speed Vwf (i.e. a secondary wheel speed) from the rear wheel speed Vwr (i.e. a primary wheel speed).

The torque split control unit 40 of this embodiment further includes a circuit 40*h* for computing a desired clutch engagement force Tm, a Tm-i converting circuit 40*i* for converting the output signal of the circuit 40*h* to a current signal i, an output circuit 40*j* for outputting the dither current i*, a circuit 40*l* for determining a lateral acceleration (or side acceleration) Yg of the vehicle by using an output signal Syg1 of the first lateral acceleration sensor 30*e* and an output signal Syg2 of the second lateral acceleration sensor 30*f*, a circuit 40*m* for determining a gain Kh in accordance with the lateral acceleration Yg, a circuit 40*n* for determining a vehicle body speed Vi. The control unit 40 further includes analog-to-digital converters A/D and a digital-to-analog converter D/A.

The torque split control unit 40 of this embodiment controls the driving force distribution according to a control procedure shown in FIG. 4.

At a step 80, the analog signals Swfl, Swfr, Swrl, Swrr, Syg1, Syg2 and Sxg are inputted to the control unit 40.

At a step 81, the control unit 40 determines the front left wheel speed Vwfl, the front right wheel speed Vwfr, the rear left wheel speed Vwrl, and the rear right wheel speed Vwrr by using the period of a comparator output of each rotation sensor signal.

At a step 82, the control unit 40 determines the front wheel speed Vwf, the rear wheel speed Vwr, and the lateral acceleration Yg. In this embodiment, the front wheel speed Vwf is the average of the front left and front right wheel speeds Vwfl and Vwfr, the rear wheel speed Vwr is the average of the rear left and rear right wheel speeds Vwrl and Vwrr, and the lateral acceleration Yg is the average of the first and second lateral accelerations Yg1 and Yg2, respectively, represented by the signals Syg1 and Syg2 of the first and second lateral acceleration sensors 30*e* and 30*f*.

At a step 83, the control unit 40 determines the wheel speed difference DVw which is a difference obtained by subtracting the front wheel speed Vwf (that is, the secondary wheel speed) from the rear wheel speed Vwr (that is, the primary wheel speed). In this embodiment, DVw is zero when Vwf is higher than Vwr, and DVw is equal to or higher than zero.

At a step 84, the control unit, 40 determines a control gain Kh in accordance with the reciprocal of the lateral acceleration Yg by using the following equation.

$$Kh = a/Yg \text{ (provided that } Kh \leq b\text{)}$$

For example, a=1 and b=10. That is, Kh is inversely proportional to Yg.

At a step 85, the control unit 40 determines a vehicle body speed Vi. In this embodiment, the vehicle body speed Vi is equal to the time integral of the absolute value of the longitudinal acceleration Xg sensed by the longitudinal acceleration sensor 30*g*.

Then, the control unit 40 determines, at a step 86, whether the vehicle is in a predetermined accelerating state, and determines, at a step 87, whether the rear wheels 6 (the primary drive wheels) are in a wheel spin state. The control unit 40 of this embodiment determines, at the step 86, whether the longitudinal acceleration X9 sensed by the longitudinal acceleration sensor 30*g* is equal to or higher than a predetermined longitudinal acceleration value Xgo (0.1 m/sec$^2$, for example). At the step 87, the control unit 40 of this embodiment determines whether the rear wheel speed Vwr (.i e the primary wheel speed) is equal to or higher than a threshold speed f(vi) which is a function of the vehicle body speed Vi. For example, the threshold speed f(Vi) is given by:

$$f(Vi) = Vi \times 1.05 + 8 \text{ (km/h)}$$

Figure 5:
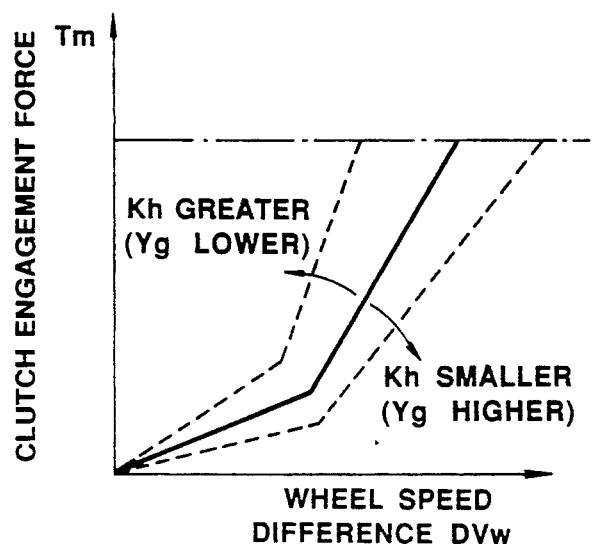
FIG. 5 is a graph of a control characteristic of a clutch engagement force with respect to a wheel speed difference, which can be employed in the first embodiment.

If either (or both) of the answers of the decision steps 86 and 87 are negative, then the control unit 40 proceeds to a step 88. If both the conditions of the decision steps 86 and 87 are satisfied, then the control unit 40 proceeds to a step 89. At the step 88, the control unit 40 computes a desired clutch engagement force Tm by using the control gain Kh and the wheel speed difference DVw. In this embodiment, the desired clutch engagement force Tm determined at the step 88 is equal to a product obtained by multiplying the wheel speed difference DVw by the control gain Kh. However, it is optional to employ a control characteristic shown in FIG. 5. At the step 89, the control unit 40 computes the desired clutch engagement force Tm without using the wheel speed difference DVw. In this embodiment, the desired clutch engagement force Tm of the step 89 is determined from the longitudinal acceleration Xg and the absolute value |Yg| of the lateral acceleration Yg by using the following equation.

$$Tm = Kxg(Xg - 2 \cdot |Yg|)$$

That is, the desired clutch engagement force Tm obtained at the step 89 is increased as the longitudinal acceleration Xg increases, and proportional to the longitudinal acceleration Xg when the lateral acceleration is zero, and it is decreased as the lateral acceleration increases, in order to improve the cornering performance. In this embodiment, Yg is positive when the lateral acceleration is in one of the left and right directions, and Yg is negative when the lateral acceleration is in the other direction.

At a step 90, the control unit 40 converts the signal representing the desired clutch engagement force Tm determined at the step 88 or 89, into a solenoid drive current i by using a predetermined Tm-i characteristic table.

At a step 91, the control unit 40 delivers the dither current i* (i±0.1A, 100 Hz, for example) to the solenoid valve 28 to achieve the desired clutch engagement force Tm determined at the step 88 or 89.

The control system of the first embodiment is operated as follows:

(A) Normal operation

When the vehicle is moving in a straight line on a road of a high friction coefficient, and the front and rear wheels are free from wheel spin (overspeed rotation), then the control unit 40 proceeds from the step 86 or 87 to the step 88, and increases the clutch engagement force of the torque distributing clutch as the wheel speed difference DVw increases. Therefore, the control system can prevent slip of the primary drive rear wheels 6 by increasing the allotment of the driving force distributed to the front wheels. Furthermore, the control system can prevent the undesired effect of tight corner braking by decreasing the control gain Kh in accordance with the lateral acceleration Yg, and minimize the drive wheel slip by increasing the control gain Kh on a slippery road where the lateral acceleration is low.

(B) Acceleration on a low friction coefficient road

When four wheel spin occurs in a rapid start or a medium acceleration on a low friction coefficient road, the control unit 40 proceeds from the step 87 to the step 89, and calculates, at the step 89, the desired clutch engagement force Tm which is greater than the clutch engagement force of the step 88. Thus, the control system of this embodiment increases the clutch engagement force to increase the tendency to the 4WD state, even if the wheel speed difference DVw is still low, when the control system detects a rear wheel spin preceding the four wheel spin. Therefore, the control system can prevent hunting, that is, undesirable oscillation of the controlled clutch engagement force, so that noises and vibrations due to the hunting are prevented, and the durability of the torque distributing clutch is improved. Furthermore, the control system of this embodiment improves the driving performance of the vehicle in low friction coefficient road conditions by increasing the tendency to the 4WD state. The control system of this embodiment is arranged to compute the desired clutch engagement force Tm of the step 89 by using not only the longitudinal acceleration Xg but also the lateral acceleration Yg. Therefore, the control system of the embodiment can improve the cornering stability by decreasing the clutch engagement force at acceleration on a turn. However, it is possible to modify the step 89 so that the clutch engagement force Tm of the step 89 is determined in accordance with the longitudinal acceleration Xg alone without using the lateral acceleration, or the clutch engagement force is fixed at such a high constant value as to ensure a sufficiently rigid 4WD state, irrespective of vehicle operating conditions and road conditions.

In this embodiment, the rear wheels are the primary drive wheels directly connected with the engine. However, the present invention is applicable to a vehicle in which the front wheels are the primary drive wheels and the rear wheels are the secondary drive wheels.

A second embodiment of the present invention is shown in FIGS. 6-9.

As shown in FIG. 6, a torque split (driving force distribution) control system of the second embodiment is almost the same as the control system of the first embodiment. The clutch engagement force computing circuit 40h of the second embodiment is connected with the front wheel speed computing circuit 40e, and designed to detect a wheel spin of the front (secondary drive) wheels 10.

Figure 7:
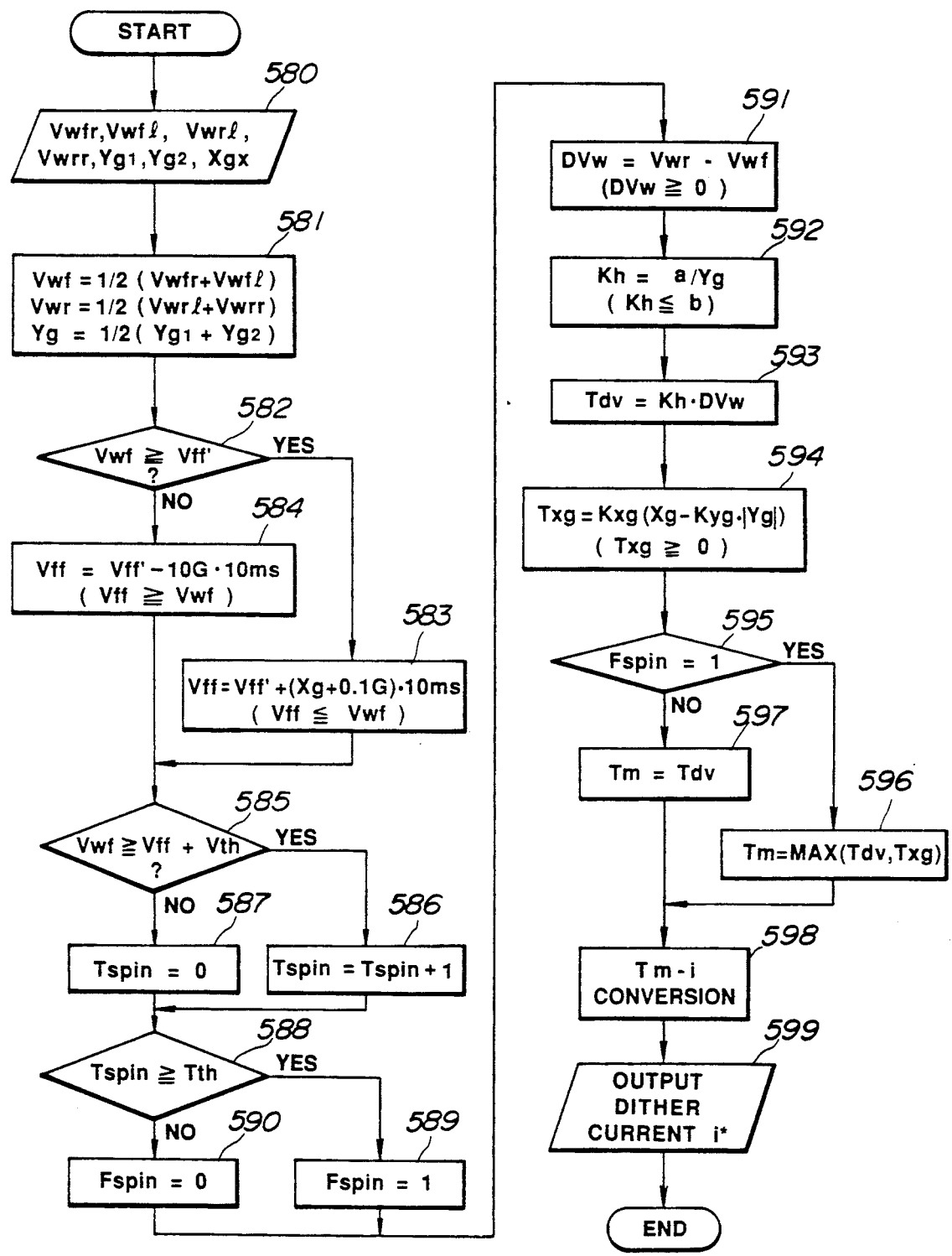
FIG. 7 is a flow chart showing a control procedure performed by the control unit of the second embodiment.

The control unit 40 of the second embodiment controls the driving force distribution by performing a control procedure shown in FIG. 7 at regular intervals of 10 msec, for example.

At a step 580, the control unit 40 of the second embodiment obtains the front left wheel speed Vwfl, the front right wheel speed Vwfr, the rear left wheel speed Vwrl, the rear right wheel speed Vwrr, the first and second lateral accelerations Yg1 and Yg2, and the longitudinal acceleration Xg.

At a step 581, the control unit 40 computes the front wheel speed Vwf by averaging the front left and right wheel speeds Vwfl and Vwfr, the rear wheel speed Vwr by averaging the rear left and right wheel speeds Vwrl and Vwrr, and the lateral acceleration (or side acceleration) Yg by averaging the first and second lateral accelerations Yg1 and Yg2.

At steps 582-584, the control unit 40 estimates a vehicle body speed Vff.

At the step 582, the control unit 40 determines whether the current front wheel speed Vwf obtained in the current execution of the control cycle is equal to or higher than an old vehicle body speed Vff'. The old vehicle body speed Vff' is a value of the vehicle body speed which was determined in the previous repetition of the control cycle, 10 msec ago. Thus, the control unit 40 determines whether the vehicle is in an accelerating state. If the current front wheel speed Vwf is equal to or higher than the old vehicle body speed Vff', then the control unit 40 proceeds from the step 582 to the step 583. If the current front wheel speed Vwf is lower than the old vehicle body speed Vff', then the control unit 40 proceeds to the step 584.

At the step 583, the control unit 40 computes the new vehicle body speed Vff by using the following equation.

Vff=Vff'+(Xg+0.1G) 10 msec (provided that Vff≦Vwf)

At the step 584, the control unit 40 computes the new vehicle body speed Vff by using the following equation.

Vff=Vff'−10G.10 msec (provided that Vff-Vwf)

At steps 585-590, the control unit 40 determines whether the front (secondary drive) wheels 10 are in a wheel spin state.

At the step 585, the control unit 40 determines whether the current front wheel speed Vwf is equal to or higher than a predetermined threshold wheel speed. In the second embodiment, the threshold wheel speed is Vff+Vth (for example, Vth = 1 km/h). If the current front wheel speed Vwf is equal to or higher than the threshold speed Vff + Vth, then the control unit 40 increments a timer count Tspin (Tspin=Tspin+1), at the step 586. If the answer of the decision step 585 is negative, then the control unit 40 resets the timer to zero (Tspin=0).

At the step 588, the control unit 40 determines whether the timer count Tspin is equal to or greater than a predetermined time duration Tth. If it is, the control unit 40 sets a wheel spin condition flag Fspin equal to one (Fspin=1). If the timer count Tspin is smaller than Tth, then the control unit 40 sets the wheel spin flag Fspin equal to zero (Fspin=0).

At steps 591-594, the control unit 40 computes the desired clutch engagement force. At the step 591, the control unit 40 computes the front and rear wheel speed difference DVw by subtracting the front wheel speed Vwf from the rear wheel speed Vwr. That is, DVw=Vwr−Vwf (provided that DVw≧0).

At the step 592, the control unit 40 determines the control gain Kh by dividing a predetermined constant a by the lateral acceleration Yg.

Kh=a/Yg (provided that Kh≦b) The control gain Kh of this embodiment is inversely proportional to the lateral accelerating Yg.

At the step 593, the control unit 40 determines a first desired clutch engagement force Tdv by multiplying the wheel speed difference DVw by the control gain Kh. It is optional to employ the control characteristic shown in FIG. 5.

At the step 594, the control unit 40 determines a second desired clutch engagement force Txg by using the longitudinal acceleration Xg, the absolute value of the lateral acceleration Yg, and constants Kxg and Kyg.

The equation used in the step 594 is:
Txg=Kxg(Xg−Kyg.|Yg|) (provided that Txg≦0)

For example. Kxg=100 and Kyg=2.

At steps 595-597, the control unit 40 selects one of the first and second clutch engagement forces Tdv and Txg.

At the step 595, the control unit 40 determines whether the wheel spin flag Fspin is equal to one. If it is, the control unit 40 proceeds to the step 596, and determines the final clutch engagement force Tm by selecting the greater of the first and second desired clutch engagement forces Tdv and Txg. That is, the final clutch engagement force Tm is set equal to Tdv if Tdv is greater than Txg, and set equal to Txg if Txg is greater than Tdv. If the wheel spin flag Fspin is equal to zero, then the control unit 40 sets the final clutch engagement force Tm equal to the first clutch engagement force Tdv responsive to the wheel speed difference, at the step 597.

At a step 598, the control unit 40 converts the final clutch engagement force Tm determined at the step 96 or 97 into the solenoid drive current i by using a predetermined Tm-i relationship table.

At a step 599, the control unit 40 delivers the dither current i* (for example, i+0.1 A, 100 Hz) to the solenoid valve 28 to achieve the clutch engagement force Tm.

The control system of the second embodiment is operated as follows:

When the vehicle is in a normal straight operation on a high friction coefficient road without front wheel spin, the control unit 40 proceeds from the step 595 to the step 597, and therefore, prevents drive wheel slip of the rear wheels by increasing the clutch engagement force of the torque distributing transfer clutch as the wheel speed difference DVw increases. During a turn on a high friction coefficient road, the control unit 40 prevents the undesired effect of tight corner braking by decreasing the control gain Kh with increase in the lateral acceleration (or side acceleration) Yg. During a turn on a low friction coefficient road, the control unit 40 can reliably prevent drive wheel slip by increasing the tendency to the 4WD state by increasing the control gain Kh as the reciprocal of the lateral acceleration increases.

Figure 9:
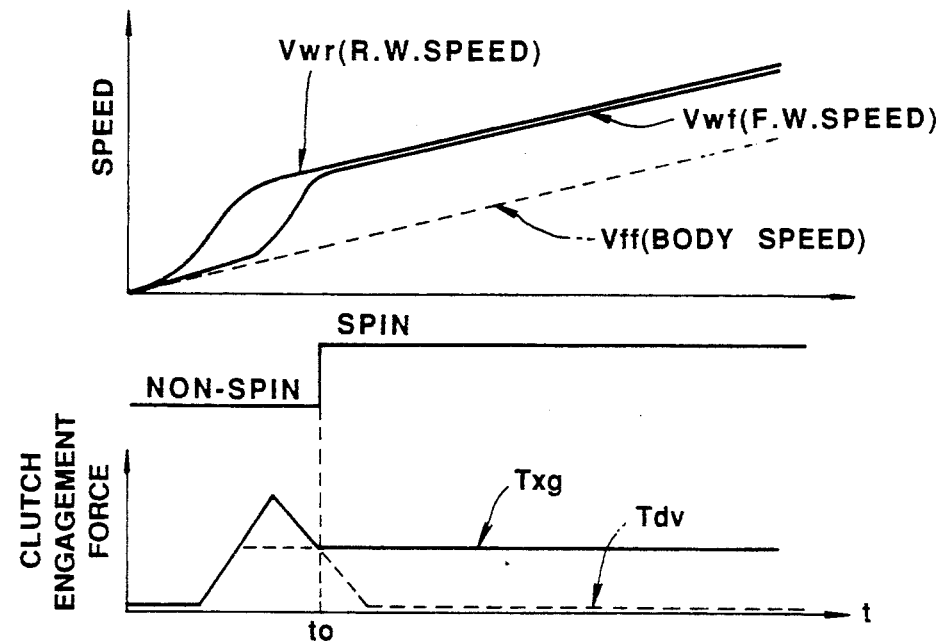
FIG. 9 is a time chart for showing operations of the control system of the second embodiment.

When a front wheel spin occurs on a low friction coefficient road because of a rapid acceleration to start the vehicle, or a medium acceleration, the control unit 40 proceeds from the step 595 to the step 596, and increases the clutch engagement force of the torque distributing transfer clutch by selecting the greater of the first and second desired clutch engagement forces Tdv and Txg. Therefore, the control system of the second embodiment detects a front wheel spin at an instant t9 as shown in FIG. 9, and changes the control mode at the instant t0 from the control responsive to the wheel speed difference, to the control responsive to the longitudinal acceleration. In this way, the control system prevents the undesirable hunting by preventing the clutch engagement force from decreasing with decrease in the wheel speed difference, as shown in FIG. 9. This control system can prevent undesirable noise and vibrations of the vehicle by preventing the hunting of the control system, and improve the durability of the clutch. Furthermore, the control system of the second embodiment can improve the driving performance on a low friction coefficient road by preventing excessive rear wheel spin by increasing the tendency to the 4WD state. During a cornering and accelerating operation in which the lateral acceleration Yg tends to increase, the control unit decreases the clutch engagement force Txg in accordance with the lateral acceleration Yg, and prevents the understeering characteristic from becoming too strong.

However, it is possible to determine the second desired clutch engagement force Txg in accordance with the longitudinal acceleration Xg (which is a variable corresponding to the friction coefficient of the road surface) alone without using the lateral acceleration.

Figure 10:
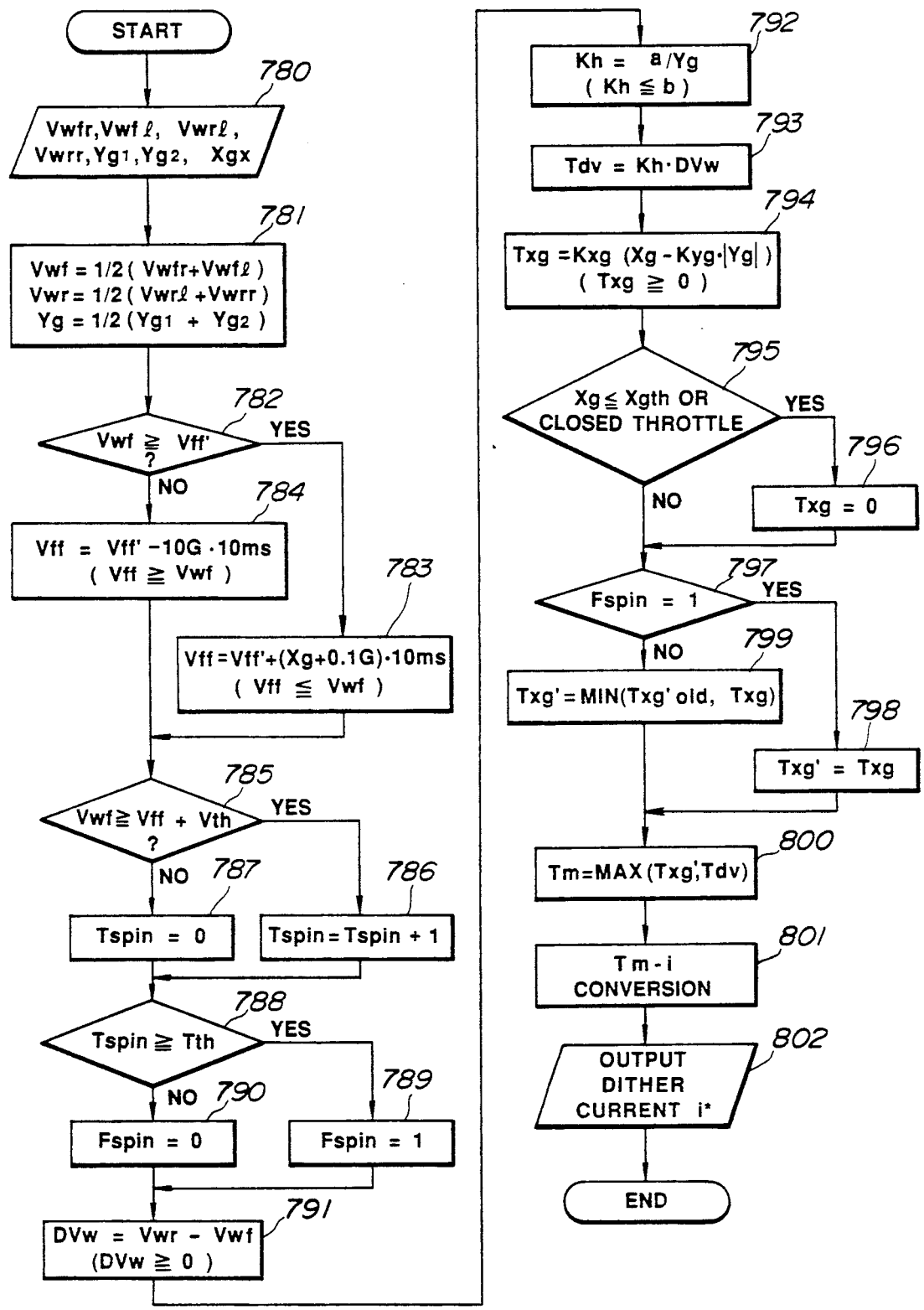
FIG. 10 is a flow chart showing a control procedure performed by a control unit of a third embodiment of the invention.

A third embodiment of the invention is shown in FIG. 10. A control system of the third embodiment is almost the same as the control system of the second embodiment.

The control unit 40 of the third embodiment performs the control program shown in FIG. 10 at regular time intervals of 10 msec.

The steps 780-794 of FIG. 10 are substantially identical to the steps 580-594 of FIG. 7, respectively.

Steps 795 and 796 of FIG. 10 are designed to handle tack-in of the vehicle.

At the step 795, the control unit 40 of the third embodiment determines whether the longitudinal acceleration Xg is equal to or lower than a predetermined threshold value Xgth for discrimination of tack-in (for example, Xgth=+0.1 G; i.e. the longitudinal acceleration in the rearward direction, having the magnitude of 0.1 G). Alternatively, the control unit 40 determines, at the step 795, whether the throttle valve of the engine is in a fully closed position. In this case, the control system includes a throttle (accelerator) position sensor 30h, as shown by a broken line in FIG. 2, for detecting the fully closed throttle position. If the answer of the step 95 for discriminating the tack-in condition is affirmative, then the control unit 40 proceeds to the step 796, and sets the second clutch engagement force Txg equal to zero. Thus, the control system of the third embodiment makes the clutch engagement force equal to zero when the possibility of the tack-in is high.

At a step 797 of FIG. 10, the control unit 40 determines whether the front wheel spin condition flag Fspin is equal to one. If it is, then the control unit 40 proceeds to a step 798. If it is not, then the control unit 40 proceeds to a step 799.

At the step 798, the control unit 40 determines a third clutch engagement force Txg' dependent on the longitudinal acceleration Xg by using the second clutch engagement force Txg obtained at the step 794 or 796. That is, the third clutch engagement force Txg' is set equal to the second clutch engagement force Txg determined at the step 94 or 96.

At the step 799, the control unit 40 determines the third clutch engagement force Txg' by selecting the smaller of the second clutch engagement force Txg determined at the step 794 or 796, and an old clutch engagement force Txg'old which is an old value of the third clutch engagement force Txg', determined in the previous repetition of the control cycle, 10 msec ago. At the step 799, the third clutch engagement force Txg' is set equal to the old third clutch engagement force Txg'old when Txg'old is smaller than Txg, and set equal to the second clutch engagement force Txg determined at the step 794 or 796 of the current control cycle if Txg is smaller than Txg'old. In this way, the control unit 40 inhibits the third clutch engagement force Txg' from increasing when Fspin=0.

At a step 800, the control unit 40 of the third embodiment determines the final clutch engagement force Tm by selecting the greater of the third clutch engagement force Txg' obtained at the step 798 or 799, and the first clutch engagement force Tdv obtained at the step 793. That is, the final clutch engagement force Tm is equal to the first clutch engagement force Tdv if Tdv is greater than Txg', and equal to the third clutch engagement force Txg' if Txg' is greater than Tdv.

At a step 801, the control unit 40 converts the final clutch engagement force Tm determined at the step 800, into the solenoid drive current i by using a predetermined Tm-i characteristic table. At a step 802, the control unit 40 sends the dither current i* to the solenoid valve 28.

When the vehicle is in a straight ahead operation on a dry paved road without undergoing front wheel spin, the control unit 40 of the third embodiment follows the sequence of steps 794-795-797-799-800-801-802 in the flowchart shown in FIG. 10. Accordingly, the control unit 40 selects the first clutch engagement force Tdv responsive to the front and rear wheel speed difference DVw, and prevents a drive wheel slip by increasing the driving force distributed to the front wheels as the wheel speed difference DVw increases. Furthermore, the control system can prevent the undesired effect of tight corner braking by decreasing the control gain Kh with increase in the lateral acceleration, as in the preceding embodiments.

Figure 8:
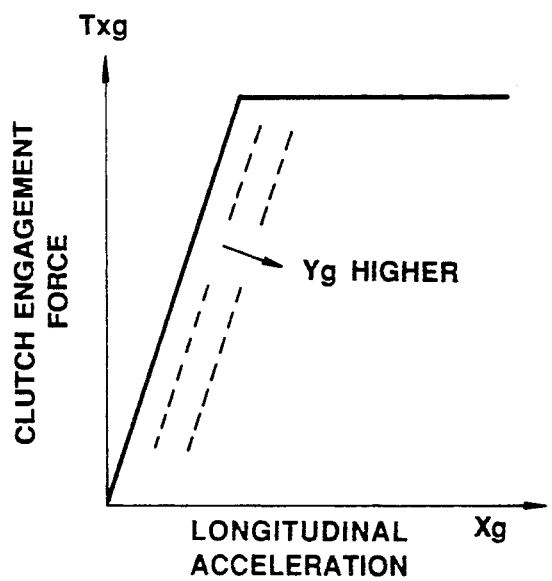
FIG. 8 is a graph showing a control characteristic of the clutch engagement force with respect to the longitudinal acceleration, which is in the second embodiment.

When a front wheel spin is produced on a slippery road surface during a rapid starting operation or a medium accelerating operation, the control unit 40 follows the sequence of steps 794-795-797-798-800-801-802. Accordingly, the control unit 40 selects the second clutch engagement force Txg based on the longitudinal acceleration Xg, and makes the clutch engagement force of the torque distributing clutch high in accordance with the longitudinal acceleration, as shown in FIG. 8. Thus, the control system of the third embodiment changes the control mode from the first mode based on the wheel speed difference to the second mode to prevent hunting, at an instant at which a front wheel spin is detected, and prevents short-period hunting peculiar to the control responsive to the wheel speed difference. During a turn with acceleration, the control system decreases the second clutch engagement force Txg in accordance with the lateral acceleration Yg, and prevents the vehicle steering characteristic from becoming strong understeer.

Figure 12:
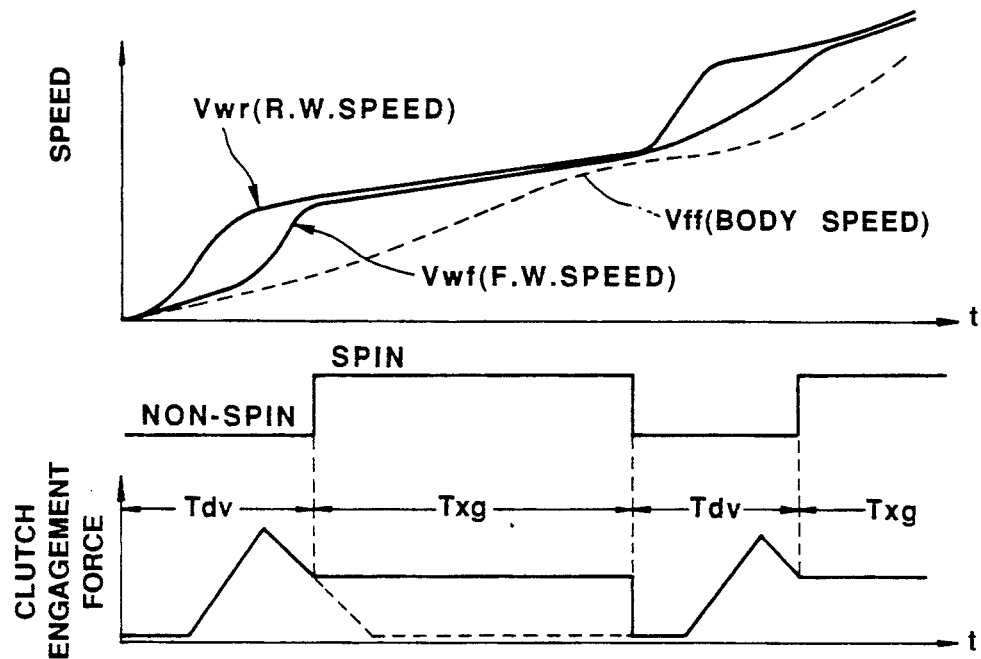
FIG. 12 is a time chart for showing a long-period hunting.

In general, the vehicle body speed is estimated by integrating the longitudinal acceleration or some other approximate calculation because it is very difficult to accurately detect the actual vehicle body speed. As a result, the estimated vehicle body speed Vff approaches the front wheel speed Vwf with error due to integration, and the answer of the front wheel spin detecting step 785 becomes negative while the front wheels are still in the wheel spin state with respect to the true vehicle body speed. If the control system were designed to terminate the control for preventing hunting at the time of reset of the wheel spin flag Fspin to zero, then the control based on the wheel speed difference would be resumed prematurely, resulting in recurrence of the front wheel spin and a long-period hunting, as shown in FIG. 12.

Figure 13:
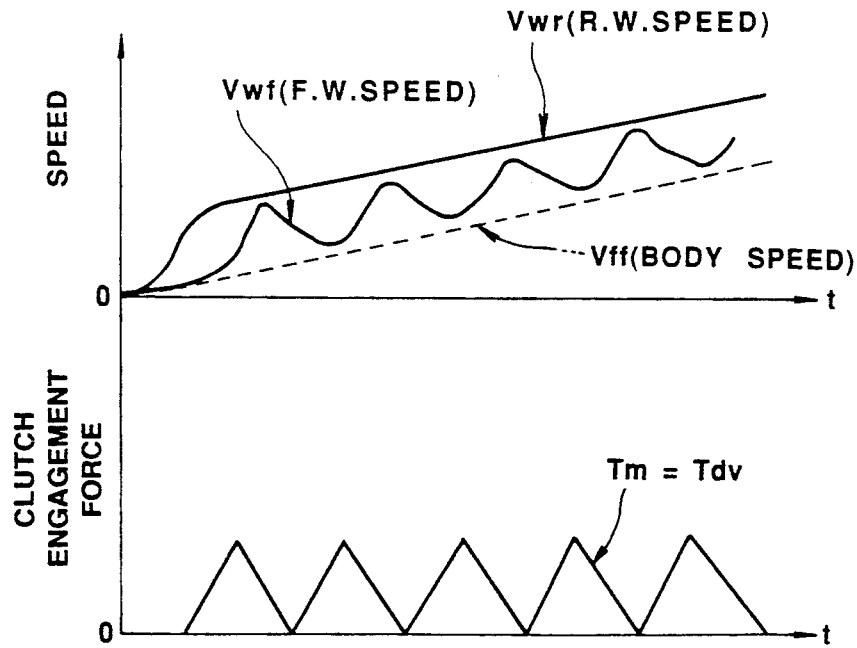
FIG. 13 is a time chart for showing a short-period hunting appearing in the conventional control system.

When the answer of the step 785 becomes negative to indicate the termination of the wheel spin state, and the wheel spin flag Fspin is cleared, the control system of the third embodiment follows the sequence of steps 797 799-800. Therefore, the control unit 40 of the third embodiment prevents the third clutch engagement force Txg' from increasing, and continues the hunting preventive control based on the longitudinal acceleration until the first clutch engagement force Tdv exceeds the third clutch engagement force Txg'. By continuing the hunting preventive control for a limited time interval after the detection of absence of the front wheel spin condition, the control system of the third embodiment can prevent the long-period hunting which would be caused by error in the front wheel spin condition detection, resulting from accumulation of estimation error of the vehicle body speed. Thus, the control system of the third embodiment can prevent unpleasant noises and vibrations of the vehicle and improve the durability of the torque distributing clutch by preventing both the short-period hunting shown in FIG. 13 and the long-period hunting shown in FIG. 12. Furthermore, the control system can prevent excessive wheel spin and improve the driving performance in a rapid start or a medium acceleration on a slippery road surface by performing the hunting preventing control which provides a high clutch engagement force corresponding to the magnitude of the vehicle acceleration.

If the accelerator pedal is released during the hunting preventive control, the control unit 40 of the third embodiment makes the second clutch engagement force Txg equal to zero at the step 796. Therefore, the control system of the third embodiment puts the drive system in the two rear wheel drive state during an accelerator-off operation, and improve the yawing response of the vehicle by decreasing the understeer tendency due to the four wheel drive and utilizing the tuck-in.

Figure 11:
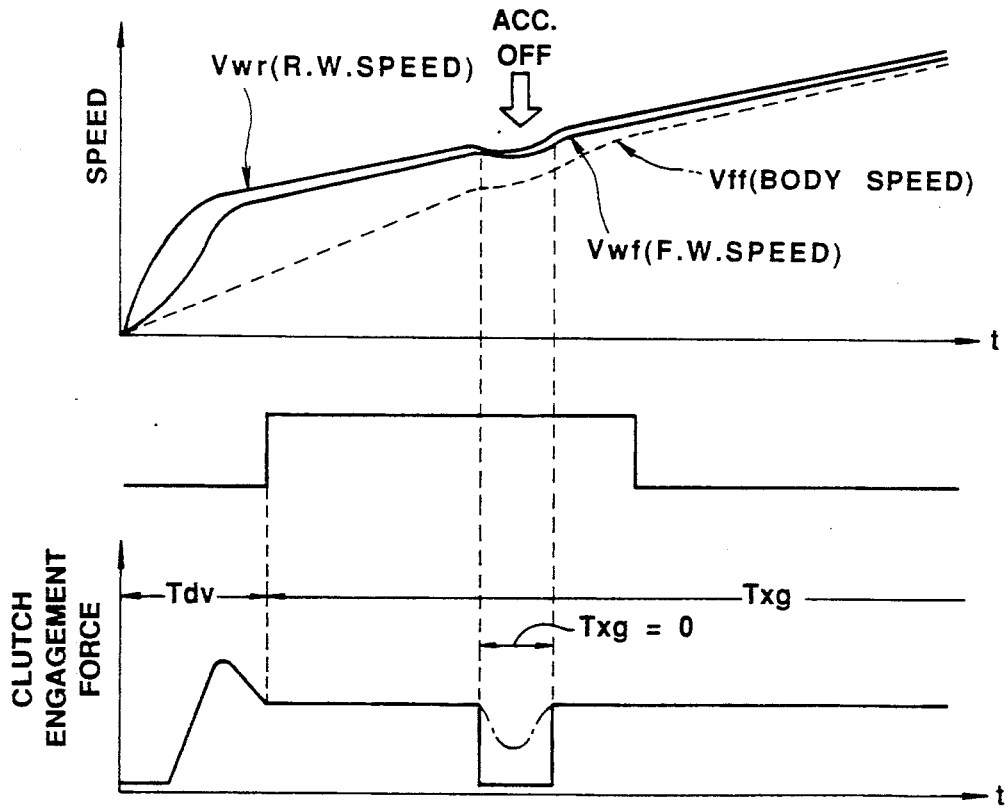
FIG. 11 is a time chart for showing operations of the control system of the third embodiment.

When the vehicle is started with rapid acceleration on a low friction coefficient road, the control system of the third embodiment controls the clutch engagement force as shown in FIG. 11. As shown in FIG. 11, the control system of the third embodiment prevents the short-period hunting shown in FIG. 13 by starting the hunting preventing control when the front wheel spin is detected, and prevents the long-period hunting shown in FIG. 12 by continuing the hunting preventing control after the subsidence of the front wheel spin. When the accelerator pedal is released, the control system of the third embodiment temporarily decreases the clutch engagement force to zero, as shown in FIG. 11 to improve the yawing characteristic.

The control system of the third embodiment is arranged to terminate the hunting preventive control when the first desired clutch engagement force dependent on the wheel speed difference exceeds the second clutch engagement force dependent on the longitudinal acceleration. However, it is possible to terminate the hunting preventive control at the end of a predetermined constant time interval starting from the change of the flag Fspin from one to zero, or at the end of a variable time interval determined in accordance with the longitudinal acceleration.

What is claimed is:

1. A drive force distribution control system for a vehicle, said driving force distribution control system comprising:
 a torque distributing unit including a primary drive unit to transmit a driving force from an engine of said vehicle to primary drive wheels of said vehicle, and a secondary drive unit which includes a torque distributing clutch, and which transmits a driving force from said engine to secondary drive wheels of said vehicle through said torque distributing clutch to vary the driving force transmitted to said secondary drive wheels in response to a control signal, a first detecting means for determining a wheel speed difference between a primary wheel speed of said primary wheels and a secondary wheel speed of said secondary wheels, a condition discriminating means for detecting a wheel spin of at least one of said wheels, and for producing a wheel spin condition signal which is normally in a first signal state, and in a second signal state when wheel spin is detected, a controlling means for controlling a clutch engagement force of said torque distributing clutch by producing said control signal in accordance with said wheel speed difference when said wheel spin condition signal is in said first signal state, and controlling clutch engagement force independently of said wheel speed difference so as to prevent clutch engagement force from being decreased by a decrease of said wheel speed difference to prevent hunting when said wheel spin condition signal is in said second signal state, and a second detecting means for estimating a vehicle body speed of said vehicle and for sending a signal indicative of said vehicle body speed to said condition discriminating means, wherein said condition discriminating means includes a means for determining a threshold wheel speed in accordance with said vehicle body speed and for comparing a monitored wheel speed with said threshold wheel speed, and for producing said wheel spin condition signal in said second signal state when said monitored wheel speed is equal to or higher than said threshold wheel speed, said monitored wheel speed being one of said primary wheel speed and said secondary wheel speed.

2. A driving force distribution control system according to claim 1 wherein said control system further comprises a third detecting means for determining a longitudinal acceleration of the vehicle, and said controlling means increases the clutch engagement force in accordance with said longitudinal acceleration when said wheel spin condition signal is in said second signal state.

3. A driving force distribution control system according to claim 2 wherein said controlling comprises a first processing means for producing a first intermediate signal representing a first desired clutch engagement force which increases as said wheel speed difference increases, a second processing means for producing a second intermediate signal representing a second desired clutch engagement force which increases as said longitudinal acceleration increases, and a third processing means for producing said control signal in accordance with one of said first and second intermediate signals.

4. A driving force distribution control system according to claim 3 wherein said second detecting means is connected with said third detecting means, for estimating said vehicle body speed by using said longitudinal acceleration.

5. A driving force distribution control system according to claim 3 wherein said control system further comprises a fourth detecting means for determining a lateral acceleration of the vehicle, and said second processing means of said controller means is connected with said third and fourth detecting means, and produces said second intermediate signal so that said second desired clutch engagement force increases as said longitudinal acceleration increases, and said second desired clutch engagement force decreases as said lateral acceleration increases.

6. A driving force distribution control system according to claim 5 wherein said second desired clutch engagement force represented by said second intermediate signal is equal to a product obtained by multiplying a remainder by a first predetermined coefficient, said remainder being a result remaining after subtraction from said longitudinal acceleration, of a product obtained by multiplying said lateral acceleration by a second predetermined coefficient.

7. A driving force distribution control system according to claim 6 wherein said primary drive wheels are rear wheels of the vehicle, and said secondary drive wheels are front wheels of the vehicle.

8. A driving force distribution control system according to claim 3 wherein said controlling means further comprises a fourth processing means for decreasing the magnitude of said control signal when said vehicle is in a predetermined state which exists when an accelerating system of said engine is in an idle position.

9. A driving force distribution control system according to claim 3 wherein said controlling means further comprises a fourth processing means for reducing said second desired clutch engagement force to zero when said longitudinal acceleration is equal to or lower than a predetermined threshold level.

10. A driving force distribution control system according to claim 3 wherein said control system comprises an accelerator position sensor for sensing a position of an accelerating system of said engine, and said controlling means further comprises a fourth processing means for reducing said second desired clutch engagement force to zero when said accelerating system is in an idle position.

11. A driving force distribution control system according to claim 2 wherein said torque distribution clutch is a clutch which continuously varies clutch engagement force between a fully engaged state of said clutch and a fully disengaged state of said clutch, and which reduces driving force transmitted to said secondary wheels to zero when said torque distributing clutch is fully disengaged.

12. A driving force distribution control system according to claim 2 wherein said first detecting means includes a means for subtracting said secondary wheel speed from said primary wheel speed to determine said wheel speed difference which is a difference obtained by subtracting said secondary wheel speed from said primary wheel speed, said wheel speed difference being equal to or greater than zero, said wheel speed difference being held invariably equal to zero when said secondary wheel speed is higher than said primary wheel speed.

13. A driving force distribution control system according to claim 2 wherein said controlling means comprises a first processing means for producing a first intermediate signal representing a first desired clutch engagement force which continuously increases as said wheel speed difference increases, a second processing means for producing a second intermediate signal representing a second desired clutch engagement force which continuously increases as said longitudinal acceleration increases, and a third processing means for producing said control signal in accordance with one of said first and second intermediate signals.

14. A driving force distribution control system according to claim 1 wherein said controlling means includes a means for determining a first desired clutch engagement force in accordance with said wheel speed difference, producing said control signal representing said first desired clutch engagement force when said wheel spin condition signal is in said first signal state, and holding said control signal higher than said first desired clutch engagement force when said wheel spin condition signal is in said second signal state.

15. A driving force distribution control system according to claim 14 wherein said controlling means includes a means for fixing said control signal at a predetermined constant value when said wheel spin condition signal is in said second signal state.

16. A driving force distribution control system according to claim 1 wherein said monitored wheel speed is said primary wheel speed, and said condition discriminating means detects the wheel spin of said primary drive wheels by monitoring said primary wheel speed.

17. A driving force distribution control system according to claim 16 wherein said control system further comprises a third detecting means for determining a longitudinal acceleration of the vehicle, and said condition discriminating means produces said wheel spin condition signal in said second signal state only when said longitudinal acceleration is equal to or higher than a predetermined acceleration value.

18. A driving force distribution control system according to claim 1 wherein said first detecting means comprises a means for detecting said primary wheel speed, and a means for detecting said secondary wheel speed, and said condition discriminating means is connected to said secondary wheel speed detecting means, for detecting wheel spin of said secondary drive wheels by monitoring said secondary wheel speed, said monitored wheel speed being equal to said secondary wheel speed.

19. A driving force distribution control system according to claim 18 wherein said control system further comprises a third detecting means for determining a longitudinal acceleration of the vehicle, and said controlling means increases the clutch engagement force of said torque distributing clutch in accordance with said longitudinal acceleration when said wheel spin condition signal is in said second signal state.

20. A driving force distribution control system according to claim 19 wherein said controlling means comprises a first processing means for producing a first intermediate signal representing a first desired clutch engagement force which increases as said wheel speed difference increases, a second processing means for producing a second intermediate signal representing a second desired clutch engagement force which increases as said longitudinal acceleration increases, and a third processing means for producing said control signal by selecting one of said first and second intermediate signals.

21. A driving force distribution control system according to claim 20 wherein said third processing means comprises a means for producing said control signal representing said first desired clutch engagement force when said wheel spin condition signal is in said first signal state, and a means for producing said control signal when said wheel spin condition signal is in said second signal state, in such a manner that the magnitude of said control signal is equal to said first desired clutch engagement force if said first desired clutch engagement force is greater than said second desired clutch engagement force, and equal to said second desired clutch engagement force if said second desired clutch engagement force is greater than said first desired clutch engagement force.

22. A driving force distribution control system according to claim 20 wherein said third processing mean includes a means for holding said control signal equal to said second desired clutch engagement force temporarily after said wheel spin condition signal changes from said second signal state to said first signal state.

23. A driving force distribution control system according to claim 20 wherein said third processing means comprises a holding means for holding said control signal equal to said second desired clutch engagement force as long as said second desired clutch engagement force is greater than said first desired clutch engagement force, even if said wheel spin condition signal changes from said second signal state to said first signal state.

24. A driving force distribution control system according to claim 23 wherein said third processing means comprises a preventing means for preventing said second clutch engagement force from increasing when said wheel spin condition signal is in said first signal state.

25. A driving force distribution control system according to claim 24 wherein said holding means includes a means for producing said control signal whose magnitude is equal to said first desired clutch engagement force if said first clutch engagement force is greater than said second clutch engagement force, and equal to said second desired clutch engagement force if said second clutch engagement force is greater than said first engagement force.

26. A driving force distribution control system for a vehicle, said driving force distribution control system comprising:
  a torque distributing unit including a primary drive unit to transmit a driving force from an engine of said vehicle to primary drive wheels of said vehicle, and a secondary drive unit which includes a torque distributing clutch, and which transmits a driving force from said engine to secondary drive wheels of said vehicle through said torque distributing clutch for continuously varying said driving force transmitted to said secondary drive wheels in response to a control signal and reducing driving force transmitted to said secondary drive wheels to zero when said torque distributing clutch is fully disengaged;
  a first detecting means for sensing a primary wheel speed of said primary wheels and a secondary wheel speed of said secondary wheels, and for subtracting said secondary wheel speed from said primary wheel speed to determine a wheel speed difference between said primary wheel speed and said secondary wheel speed;
  a condition discriminating means for detecting a wheel spin of at least one of said wheel by monitoring one of said primary and secondary wheel speeds, and for producing a wheel spin condition signal which is normally in a first signal state, and in a second signal state when wheel spin is detected; and
  a controlling means for controlling an actual clutch engagement force of said torque distributing clutch by determining a first desired clutch engagement force in accordance with said wheel speed difference and by producing said control signal representing said first desired clutch engagement force when said signal spin condition signal is in said first signal state, and for further controlling actual clutch engagement force independently of said wheel speed difference to prevent clutch engagement force from being decreased by a decrease of said wheel speed difference to prevent hunting when said wheel spin condition signal is in said second state, said controlling means holding said control signal higher than said first desired clutch engagement force when said wheel spin condition signal is in said second signal state.

27. A driving force distribution control system according to claim 26 wherein said control system further comprises a second detecting means for estimating a vehicle body speed of the vehicle, and said condition discriminating means includes a means for comparing a monitored wheel speed with a threshold wheel speed which is determined from said vehicle body speed estimated by said vehicle body speed estimating means, and producing said wheel spin condition signal in said second signal state when said monitored wheel speed is equal to or higher than said threshold wheel speed, said monitored wheel speed being one of said primary wheel speed and said secondary wheel speed.

* * * * *